United States Patent [19]
Heycott

[11] Patent Number: 5,173,316
[45] Date of Patent: Dec. 22, 1992

[54] METHOD FOR PREPARING FISH BAIT

[76] Inventor: William B. Heycott, 136 Ferry Road, Southport Gold Coast, Queensland 4215, Australia

[21] Appl. No.: 754,558

[22] Filed: Sep. 4, 1991

[51] Int. Cl.$^5$ ............................................. A23K 3/00
[52] U.S. Cl. ........................................ 426/1; 426/465; 426/643; 426/805
[58] Field of Search .................. 426/1, 465, 472, 643, 426/805; 34/75

[56] References Cited

U.S. PATENT DOCUMENTS

| | | | |
|---|---|---|---|
| 3,931,415 | 1/1976 | Larsen et al. | 426/1 |
| 4,145,820 | 3/1979 | Fehlhaber et al. | 34/75 |
| 4,459,763 | 7/1984 | Meissner et al. | 34/75 |

*Primary Examiner*—George Yeung
*Attorney, Agent, or Firm*—Kimmel, Crowell & Weaver

[57] ABSTRACT

A method and apparatus for preparing fish baits by subjecting raw fish or other marine or aquatic product to low temperature and low humidity for an extended period of time so that the body fluids pass out of the fish or marine product to leave a bait which has high longevity and which is resistant to detachment from a hook.

7 Claims, 1 Drawing Sheet

METHOD FOR PREPARING FISH BAIT

FIELD OF THE INVENTION

This invention relates to a method and apparatus for preparing bait and in particular to a method and apparatus for preparing preserved bait fish or other aquatic bait product.

DESCRIPTION OF THE RELATED ART

A common problem which occurs when using conventional fish bait such as pilchards or sliced slab baits is that in many instances, particularly when fishing in the surf, for example, for tailor, baits tend to become detached from the hook in normal casting procedures. Furthermore, such baits are often subject to attack by juvenile fish and vermin such as toads, butter bream and sting rays. A further disadvantage of conventional fish baits occur because in many cases such baits are supplied frozen. Difficulties firstly occur in unfreezing such baits for usage and generally when such baits are refrozen, they tend to be spoiled and unsuitable for subsequent usage. When used in traps such as crab and lobster pots, conventional fish baits have a limited life and attractiveness to fish.

SUMMARY OF THE INVENTION

The present invention aims to overcome or alleviate one or more of the above disadvantages by providing a method and apparatus for preparing bait and in particular bait fish or other marine bait products which enables such bait fish or marine bait products to be preserved in such a manner as to resist detachment from a hook during casting and which resists attack from juvenile or vermin fish. The present invention also aims to provide a method and apparatus which provides a bait which proves more attractive to fish both when applied to hooks and when used in traps for crustaceans such as crabs or lobsters. Other objects and advantages of the invention will become apparent hereunder.

With the above and other objects in view, the present invention provides in a first aspect a method for preparing baits, including fish baits comprising the steps of arranging raw aquatic product in a container, placing said container in an enclosed space and cooling and dehumidifying the air in said space for a period of time sufficient to cause internal body fluids of said product to pass out of said product. The product may comprise raw fish or fish slabs, prawns or any other marine product. Preferably, a layer of salt is applied to the product to accelerate the above process. Preferably also the temperature in said space is maintained at approximately 1 to 5 degrees Centigrade and most preferably 2 degrees Centigrade and the humidity therein at approximately 40% to 60% and most preferably 50%. The product is suitably maintained in the above environment for at least sixty hours.

The present invention also provides apparatus for preparing baits, including fish baits, said apparatus including an enclosed space for receiving raw aquatic product to be prepared as bait, container means for holding said product, and means for cooling and dehumidifying the atmosphere in said space, said cooling and dehumidifying means including duct means disposed within said space, and means for passing a cooling liquid through said duct means.

Suitably, the enclosed space is an insulated space and the liquid passed through said duct means comprises cold water which is pumped through said duct means. Most preferably, the duct means comprise a pair of ducts disposed on opposite sides of the enclosed space, such that water in the atmosphere in said space condenses thereon and falls in droplets under the influence of gravity along the side walls of the enclosed space so that the enclosed space in maintained at a uniform cool temperature and uniform humidity.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE EMBODIMENT

Figure 1:
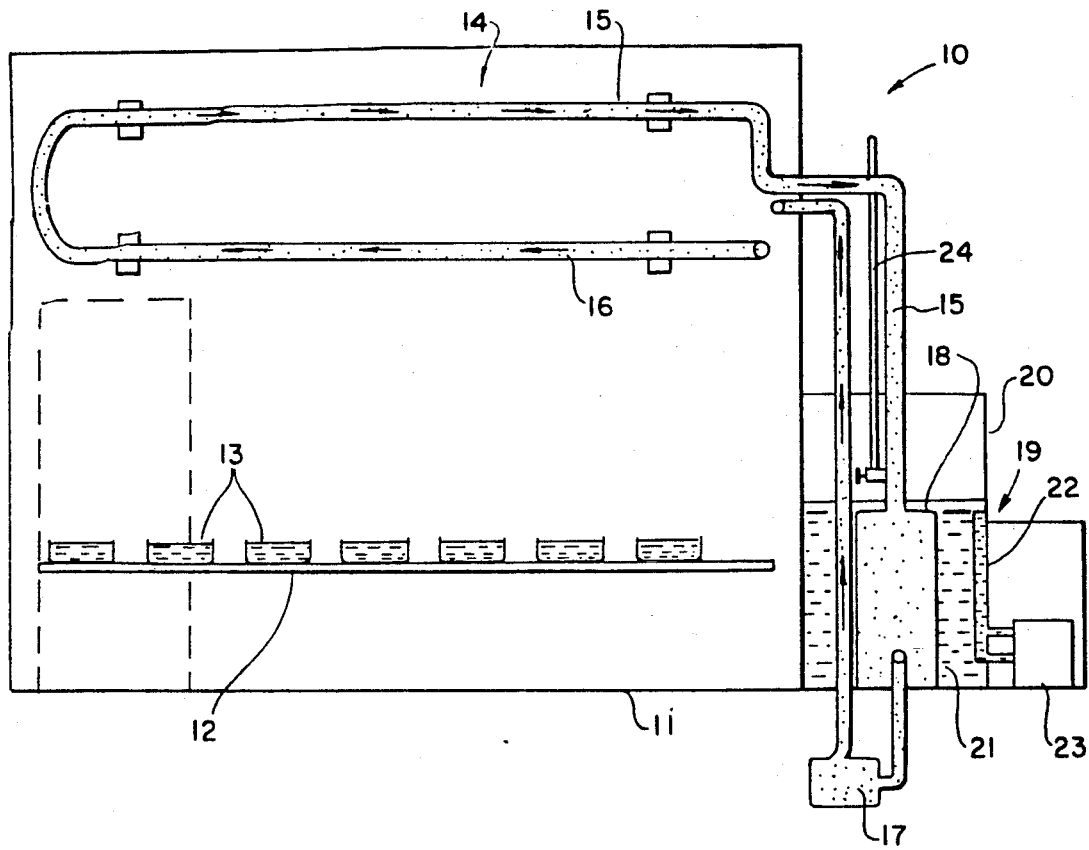
FIG. 1 illustrates in schematic view a preferred form of bait preparation apparatus according to the invention.
Figure 2:
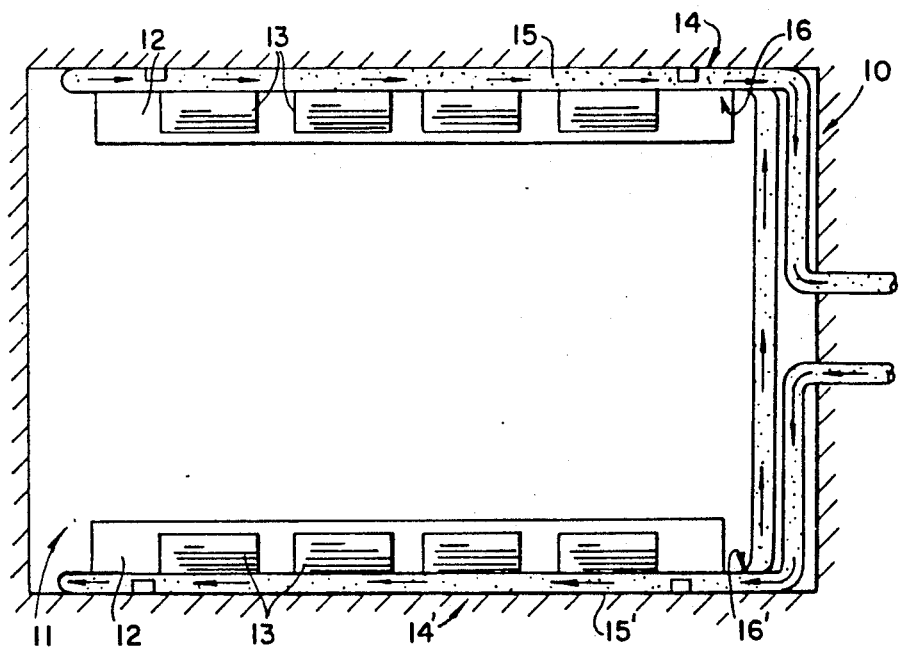
FIG. 2 is a plan view of the apparatus of FIG. 1.

Referring to the drawings, there is illustrated bait preparation apparatus 10 according to the present invention comprising an insulated enclosed space or room 11 which is provided with storage racks 12 onto which a plurality of bins 13 may be placed, each bin 13 being adapted to contain whole fish, fish slabs, or other raw marine product such as prawns to be prepared into bait. Located in the room 11 and extending along opposite side walls are two duct assemblies 14 and 14' each comprising a pair of ducts 15 and 16, and 15' and 16' respectively, the ducts of each pair being interconnected by looped portions at one end and being substantially parallel to each other along the side walls with the duct 15' of one pair 14' extending out of the room 11 and comprising an inlet duct for cold water and the other duct 16' of that pair communicating with the duct 16 of the other pair on the opposite side wall with the duct 15 of that pair extending out of the room 11 and comprising an outlet duct for the water.

Externally of the room 11, the ducts 15 and 15' communicate with a pump 17 and a tank 18 of a water cooling assembly 19. The assembly 19 comprises a chamber 20 which is filled with water 21 to the level indicated whilst the tank 18 comprises a closed tank within the chamber 20 and submerged beneath the level of water therein. The tank 18 communicates through its top wall with the outlet duct 15 and in a lower portion of a side wall with the inlet duct 15'. The chamber 20 also incorporates cooling coils or fins 22, the latter being associated with a compressor 23 such that expansion of refrigerant in the coils 22 causes cooling of the water 21. It will be apparent that heat exchange will occur between the water 21 in the chamber 20 and the water in the tank 18 and that operation of the pump 17 will cause the cold water in the tank 18 to be pumped through the ducts 15', 16', 16 and 15. Also associated with the outlet pipe 15 adjacent the tank 18 is a cock controlled vent 24 which may be opened to eliminate air lock in the cooling ducts and vent air to atmosphere.

In use standard fish bins or containers 13 are initially spread with a base layer of medium grained course salt which suitably is spread in a thickness of approximately five centimeters across the bottom of the container 13. The bait fish or slabs are then placed in layers within the containers 13 with the fish in each layer being arranged longitudinally of the containers 13 in even alignment so as to avoid corrugating the bodies of the fish and so as to retain their original body shape at the end of processing. Between each layer further layers of medium grain course salt again preferably of five centimeter thickness are applied and the final top layer of fish is also covered with a layer of salt preferably of two centimeter thickness so as to inhibit any growth of nitrifying bacteria, yeasts or molds. The filled containers 13 are then stacked into the cooling room 11 on the racks 12. The pump 17 is then operated to force cold water through the duct assemblies 14 and 14' mounted on the opposite walls of the room 11. The cool water flowing through the duct assemblies 14 and 14' cools the room to approximately two degrees Centigrade and causes humid air to be condensed into the form of cold water droplets which accumulate under the ducts 15', 15, 16 and 16' until gravitational forces cause a breakaway of the cold water drops along the full length of the ducts. The cold water droplets wet the walls of the cool room 11 so as to maintain a uniform temperature within the cool room. Condensing of the water droplets also causes a low humidity to be created within the cold room 11 so as to achieve a cold dehydrated atmosphere therein.

The bait fish, fish slabs or other marine products in their containers 13 are cooled and dehydrated with the salt boosting the dehydration process. After a period of time normally in the region of sixty hours, body fluids including body oils and blood pass out of the products into the containers 13 and the level of those fluids rises in the containers 13 causing the salt layers between the fish or slabs to partially dissolve and fall to the bottom of the containers. During this process the bait fish gain neutral gravity properties and specific gravity of the accumulated body fluids increases rapidly. The water content within the containers 13 slowly evaporates due to the low humidity established in the room 11 by the duct assemblies 14 so that the fluids within the containers contain an increasing concentration of fish oils. The dehydrating fish and fish slabs rise upwardly floating on the surface of liquid in each processing container 13.

After a further period of time in the region of eighty hours the fish bodies and slabs are transformed into a rubber-like stiff form with the skin color close to a native state and the eyes retaining a normal appearance. The fish are now ten percent dehydrated and floating on the fluid surface of each fish container. After a further period of time normally in the region of one hundred hours the fish are ready for packing and at this time the fish or fish slabs are approximately fifteen percent dehydrated and sealed externally with body oil. The soft water content of the fluids is now arrested to inhibit further process by a thick surface layer of fish oils. Dehydration thus ceases at this stage and any delays in packing will not affect the bait. The bait may then be removed and packed in conventional containers for storing in freezers or refrigerators or for despatch.

During the process described above, the ducts assemblies 14 and 14' transmit demand loading to the cold water chamber 20 and warmer egress water is feed back to the internal tank 18 located within the chamber 20. The water within the chamber 20 inhibits total freeze within the chamber 20 and the water comprises a total blanket of cold water around the tank 18, the latter being suitably formed of a highly conductive material such as copper.

The internal pumping system water pressure and capacity is constantly monitored by an aorta type valve in the side of the tank maintaining full water stock, preventing air locks forming in the duct assemblies 14 and 14'.

Temperature control is achieved as water convects in the chamber 20 and changes in temperature are detected by the thermostatic controller of the compressor 23. Thus the compressor 23 increases freezing output until the system demand for a lower temperature is satisfied. The duct assemblies 14 and 14' transmit further demand by water temperature change as temperature and humidity changes are experienced due to day to day use of the access door into the cooling room 11.

Water in the chamber 20 requires no additive due to the condensing action from air passing through the tank equalizer valve and condensation then feeds into the pumping system whilst surplus water is transferred through the aorta valve in the side of the tank 18.

To avoid total system freezing, the pump motor should run continuously and in the event of compressor breakdown, changeovers should be effected within twenty-four hours of breakdown to avoid process deviation. To obtain maximum coolant efficiency, the compressor cooling radiator should be cleaned at regular intervals suitably of the order of 30 days. It is also important that the door to the room 11 be closed and sealed as much as possible so that the process is stabilized and not subject to outside temperature variations.

Suitably, each container 13 is loaded with a maximum of twenty kilograms of fish with each layer of fish comprising five kilograms. Fish to be processed should be fresh, free of sand and slime and loose scale whilst local or interstate fish prior to processing should be frozen by cryonic process after initial culling. Block frozen fish should be thawed in salt water with a minimum SG of 1036 to effectively descale and deslime prior to processing and all fish containers should be sterilized before usage.

In use, for fishing, the body fats of the bait fish are released as oils coating the individual fishes thereby inhibiting molds and yeasts from breaking down the baits processed. Further body oils are released when pilchards or slab baits are punctured by the hooks of anglers so that fish are attracted to the bait. Baits processed as above have twelve months normal refrigeration life and eight weeks life without refrigeration provided it is not exposed to direct sunlight. Freezer life is infinite and the bait remains in an unfrozen form so as to be ready for use at any time. The process also makes the flesh of the bait fish tough so as to resist detachment during casting procedures and also to resist attack by vermin fish. Furthermore, as the original shape of the fish is retained by the process, the bait will prove more attractive to fish as well as to crustaceans where used in pots. The baits may also be returned to the refrigerator or freezer after usage without spoiling. Many species of fish may be treated with the above process for example pilchards, tuna, herrings or mullet or any other fish.

Suitably the pump 17 comprises a 2000 gallon per hour pump and the ducts 15 and 16 comprise hollow steel tubes suitably galvanized steel whilst externally of the room 11 the ducts 15 and 16 are insulated by an insulating wrap or the like. Suitably the chamber 20 has a capacity of 20 cubic feet holding 1000 liters of water. Preferably the compressor 23 comprises a ⅓ HP unit.

It will be apparent that many different configurations of cooling rooms and dehydrating and cooling apparatus may be used for achieving the desired temperature and humidity in the enclosed space other than that described. For example the compressor coils 22 may be located in the tank 18 rather than the chamber 20 so that the chamber 20 may be eliminated and the water subject to direct cooling. The tank 18 alternatively may be eliminated and the water for pumping through the duct assemblies 14 and 14' coiled by direct contact with the cooling coils 22.

Whilst the above has been given by way of illustrative embodiment of the invention, all such variations and modifications thereto as would be apparent to persons skilled in the art are deemed to fall within the broad scope and ambit of the invention as herein set forth. For example, whilst the apparatus and method of the invention are primarily suited to the preparation of fish baits, they may also be used for preparing baits from prawns or other crustaceans. The term "aquatic product" as used throughout the specification thus includes fish as well as crustaceans and other marine products.

I claim:

1. A method for preparing baits, including fish baits comprising the steps of arranging raw aquatic product in a container, placing said container in an enclosed space and cooling and dehumidifying the air in said space for a period of time sufficient to cause internal body fluids of said product to pass out of said product.

2. A method according to claim 1 including the step of applying a layer of salt to said product.

3. A method according to claim 1 including the step of maintaining the temperature in said space at approximately 1 to 5 degrees Centigrade.

4. A method according to claim 3 wherein the temperature is maintained substantially at 2 degrees Centigrade.

5. A method according to claim 1 wherein the humidity in said space is maintained at approximately 40% to 60%.

6. A method according to claim 5 wherein said humidity is maintained at substantially 50%.

7. A method for preparing baits, including fish baits comprising the steps of arranging raw aquatic product in a container, placing said container in an enclosed space, cooling said space to a temperature in the range of 1 to 5 degrees Centigrade, dehumidifying the air in said space and maintaining the humidity in said space in the range of 40% to 60%, and maintaining said product in said space for at least sixty hours so as to enable internal body fluids of said product to pass out of said product.

* * * * *